United States Patent
Moyers

(10) Patent No.: US 12,079,620 B2
(45) Date of Patent: Sep. 3, 2024

(54) SYSTEMS AND METHODS FOR DECLARATIVE BUSINESS INTELLIGENCE AND REPORTING

(71) Applicant: OPEN TEXT HOLDINGS, INC., Menlo Park, CA (US)

(72) Inventor: Roger David Moyers, Spring Hill, TN (US)

(73) Assignee: OPEN TEXT HOLDINGS, INC., Menlo Park, CA (US)

(*) Notice: Subject to any disclaimer, the term of this patent is extended or adjusted under 35 U.S.C. 154(b) by 121 days.

(21) Appl. No.: 17/977,222

(22) Filed: Oct. 31, 2022

(65) Prior Publication Data
US 2024/0143304 A1    May 2, 2024

(51) Int. Cl.
*G06F 8/65*    (2018.01)
*G06F 9/54*    (2006.01)

(52) U.S. Cl.
CPC ............... *G06F 8/65* (2013.01); *G06F 9/544* (2013.01)

(58) Field of Classification Search
None
See application file for complete search history.

(56) References Cited

U.S. PATENT DOCUMENTS

| | | | | |
|---|---|---|---|---|
| 2007/0174069 A1* | 7/2007 | Moore | ............... | G06F 11/3684 705/1.1 |
| 2009/0276771 A1* | 11/2009 | Nickolov | ............... | G06Q 30/04 718/1 |
| 2011/0099422 A1* | 4/2011 | Moore, Jr. | ............ | G06F 11/3688 714/15 |
| 2012/0101975 A1* | 4/2012 | Khosravy | ............ | G06Q 30/0201 706/55 |
| 2023/0089365 A1* | 3/2023 | Manzano | ............... | G06F 16/258 707/602 |

* cited by examiner

*Primary Examiner* — Qing Chen
(74) *Attorney, Agent, or Firm* — Sprinkle IP Law Group

(57) ABSTRACT

A new declarative approach to business intelligence (BI) and reporting focuses on streamlining the embeddability of BI and reporting (BIR) into an application (e.g., web, mobile, etc.) and allows a developer to use a REST API and declare, via a YAML file, the type of BIR dashboard, report, metric or set of metrics desired. A YAML descriptor interpreter interprets the YAML file, collaborates with a BIR server at the backend to dynamically construct the requested content, and repackages and returns the requested content in a REST API response. This new method allows application developers to avoid any need of pre-designing reports, dashboards, etc., and eliminates the need of application developers to embed client-side scripting libraries, significantly reduces the amount of effort, time, and complexity in using a BI and reporting service. Application developers simply declare what they need, and the service returns the content exactly as described in the request.

20 Claims, 14 Drawing Sheets

| | | | | | Reset | Apply |
|---|---|---|---|---|---|---|
| Default Volume | Action ∨  Create ∨  Upload  Add Folder | | | | Q | ▽ ∨ |
| ∨ 🗀 Documents | ☐ | Name | Type | Version # | Version Name  Size | Modified  Pages |
| › ☐ Applications | ☐ ... 📄 | Charts | Report Design | 1 | 43.9 KB | 3/11/2022 9:38 PM |
| › ☐ Dashboards | ☐ ... 📄 | CountryStateCity | Report Design | 1 | 18.9 KB | 3/31/2022 9:42 PM |
| ∨ 🗀 Home | ☐ ... 📄 | DoughnutPie | Report Design | 1 | 18.0 KB | 3/24/2022 7:20 AM |
| › ☐ administrator | ☐ ... 📄 | Examples | HTML Document | 1 | 5.96 KB | 3/11/2022 9:15 PM |
| › ☐ gbawari | ☐ ... 📄 | Gbawari_01 | Report Design | 1 | 50.8 KB | 3/17/2022 9:36 AM |
| › ☐ jayvee | ☐ ... 📄 | Gbawari_02 | Report Design | 1 | 50.8 KB | 3/22/2022 9:39 AM |
| › ☐ sybil | | | | | | |
| › ☐ Public | | | | | | |
| › ☐ Resources | | | | | | |
| 🗐 My Jobs | | | | | | |
| 🔔 Notifications | | | | | | |
| 🗄 Manage Volume | | | | | | |

SYSTEMS AND METHODS FOR DECLARATIVE BUSINESS INTELLIGENCE AND REPORTING

TECHNICAL FIELD

This disclosure relates generally to data analysis and management of business information. More particularly, this disclosure relates to systems, methods, and computer program products for declarative business intelligence and reporting that significantly streamlines the experience of developers and greatly reduces the complexity of coding needed in using a business intelligence and reporting service provided by an artificial intelligence platform.

SUMMARY OF THE DISCLOSURE

Business intelligence (BI) generally refers to computer systems that combine data gather, data storage, knowledge management, and data analytics for evaluating complex enterprise and competitive information for presentation to planners and decision makers alike so that they can make data-driven decisions. BI reporting broadly refers to the process of using a BI software tool (BI application) to prepare and analyze data to find and share actionable insights. Such a BI application can obtain receive data from multiple sources and transform the data into visualizations, dashboards, reports, and so on. However, to develop this BI application, the visualizations, dashboards, reports, etc. all need to be pre-designed.

This disclosure provides a new methodology for declarative business intelligence and reporting. Some embodiments focus on streamlining the embeddability of BI and reporting (BIR) into an application (e.g., a web application, a mobile application, etc.). The invention allows a developer to declare, via a Yet Another Markup Language (YAML) file referred to herein as a YAML descriptor, the desired BIR visualizations and behaviors such as the type of BIR dashboard, report, metric, or set of metrics desired.

YAML is a human-readable data-serialization language similar to eXtensible Markup Language (XML) and JavaScript Object Notation (JSON). YAML is more human-readable than XML and JSON and is used herein as a non-limiting example of a declarative language that can be used to implement embodiments disclosed herein. YAML, XML, and JSON are known to those skilled in the art and thus are not further described herein.

The YAML descriptor is sent, for instance, by a client application on a client device via a BIR REST application programming interface (API), to a YAML descriptor interpreter. The YAML descriptor interpreter, which can be implemented as a service provided by an artificial intelligence platform, interprets the YAML file and sends, via a Simple Object Access Protocol (SOAP) API, a request with an interpreted payload (e.g., in SOAP XML), to a BIR application running on the artificial intelligence platform. The BIR application, which can be implemented as a component of a backend system of the artificial intelligence platform, dynamically constructs the requested content (e.g., in HyperText Markup Language (HTML)) based on the interpreted payload and returns the dynamically constructed content to the YAML descriptor interpreter. The YAML descriptor interpreter, in turn, repackages the requested content for a REST API response and sends, via the BIR REST API, the REST API response to the client application on the client device.

The new methodology disclosed herein allows application developers to avoid any need of pre-designing reports, dashboards, etc., and eliminates the need for application developers to embed client-side scripting libraries. Application developers can declare what they need, and the service returns the content exactly as described in the request.

In one embodiment, a system may comprise a processor, a non-transitory computer-readable storage medium, and stored instructions translatable by the processor to perform a method substantially as described herein. Another embodiment comprises a computer program product having a non-transitory computer-readable storage medium storing instructions translatable by a processor to perform a method substantially as described herein.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

FIGS. 1-8 depict diagrammatic representations of screenshots of a browser-based user interface of a business intelligence and reporting application showing an example of how a developer logs into the business intelligence and reporting application and manually designs a visualization in advance of publishing the visualization for broader use later, such as displaying in web or mobile applications.

DETAILED DESCRIPTION

The invention and the various features and advantageous details thereof are explained more fully with reference to the nonlimiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a hard disk drive, flash drive or other memory), hardware circuitry or the like, or any combination.

In some cases, application developers may desire to include, embed, or otherwise integrate business intelligence (BI) and reporting content into their application such as a mobile application, web application, or other user device. To this end, existing BI and reporting (BIR) applications provide a browser-based user interface for application developers to design BI and reporting visualizations (e.g., dashboards, graphical widgets, reports, etc. with data bindings and interactive behaviors). As illustrated in FIGS. 1-8, with such a browser-based user interface, the design process requires a user (e.g., an application developer) to logon to a BIR application through a browser on a user device and manually design a visualization over multiple steps, and perhaps over multiple days, in advance of publishing the visualization for later broader use, such as displaying in web or mobile applications.

Figure 1:
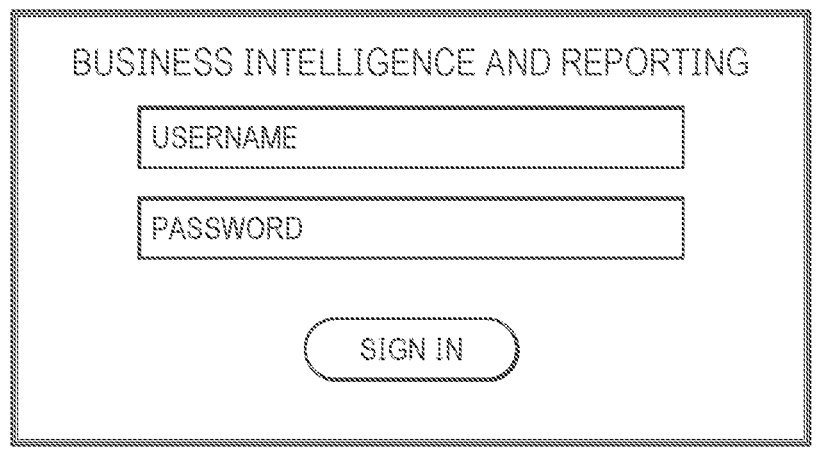
Figure 3:
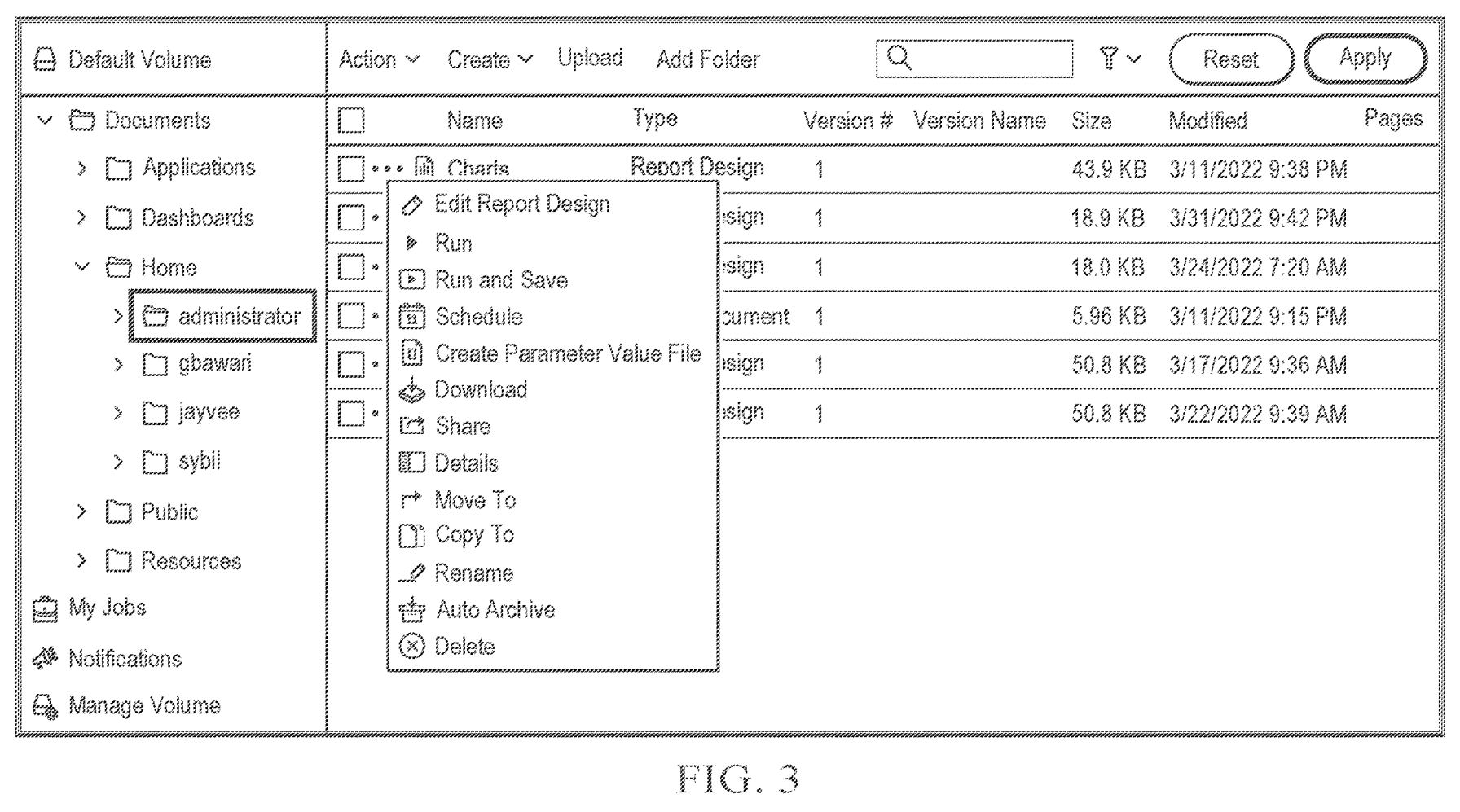

For example, as shown in FIG. 1, a user is presented a screen 100 to enter their credentials and logon to a BIR application. After logging into the BIR application, the user may create or edit visualizations within the browser-based application. FIG. 2 shows that the user is presented with a browser-based interface 200 allowing them to create, design, refine, and publish visualizations for broader consumption. As illustrated in FIG. 2, the browser-based interface may provide a listing of preexisting visualizations. The user may create a new visualization by clicking the "Create" tab shown in FIG. 2. FIG. 3 shows that the user is editing a preexisting visualization via a menu—"Edit Report Design".

Figure 4A:
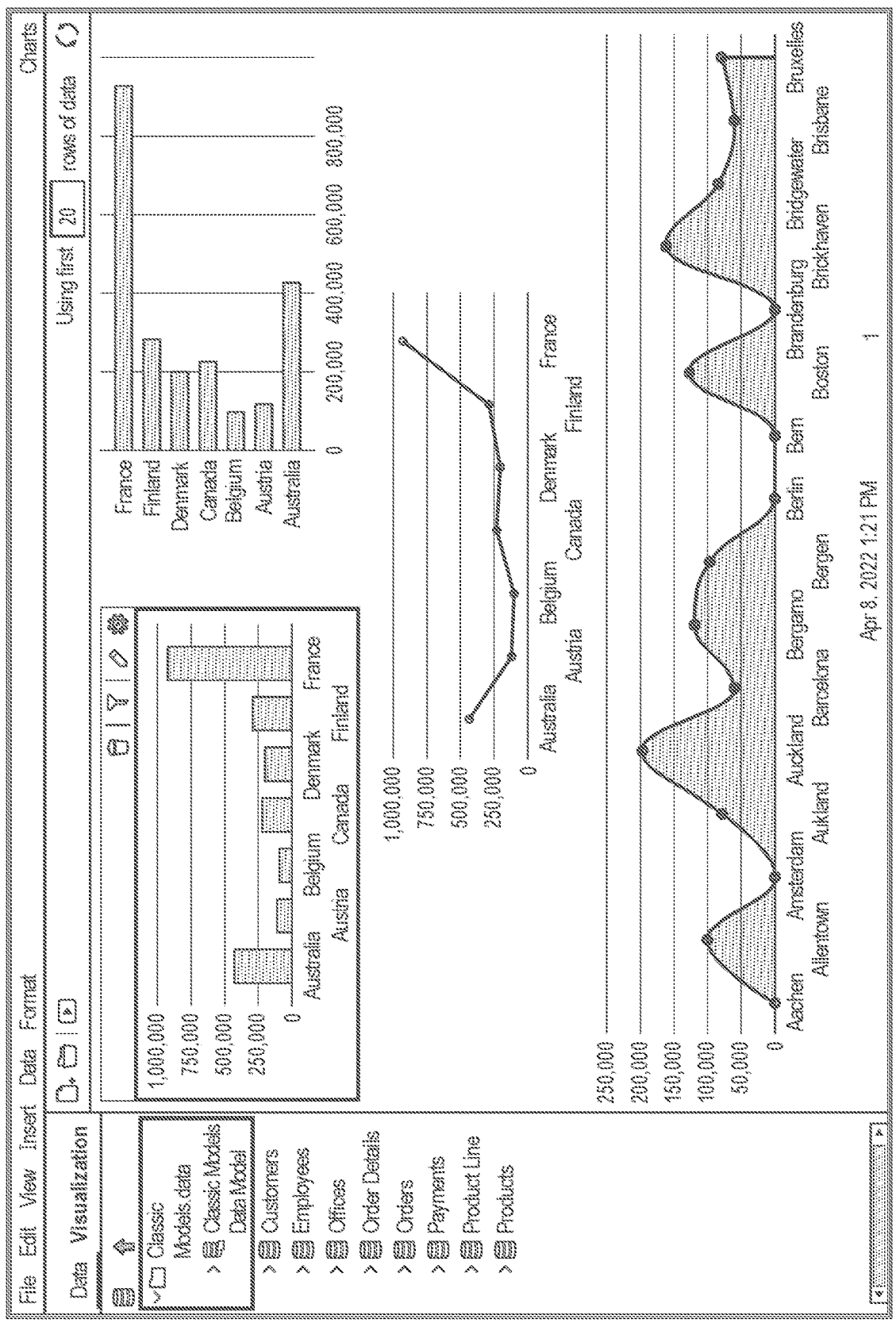
Figure 4B:
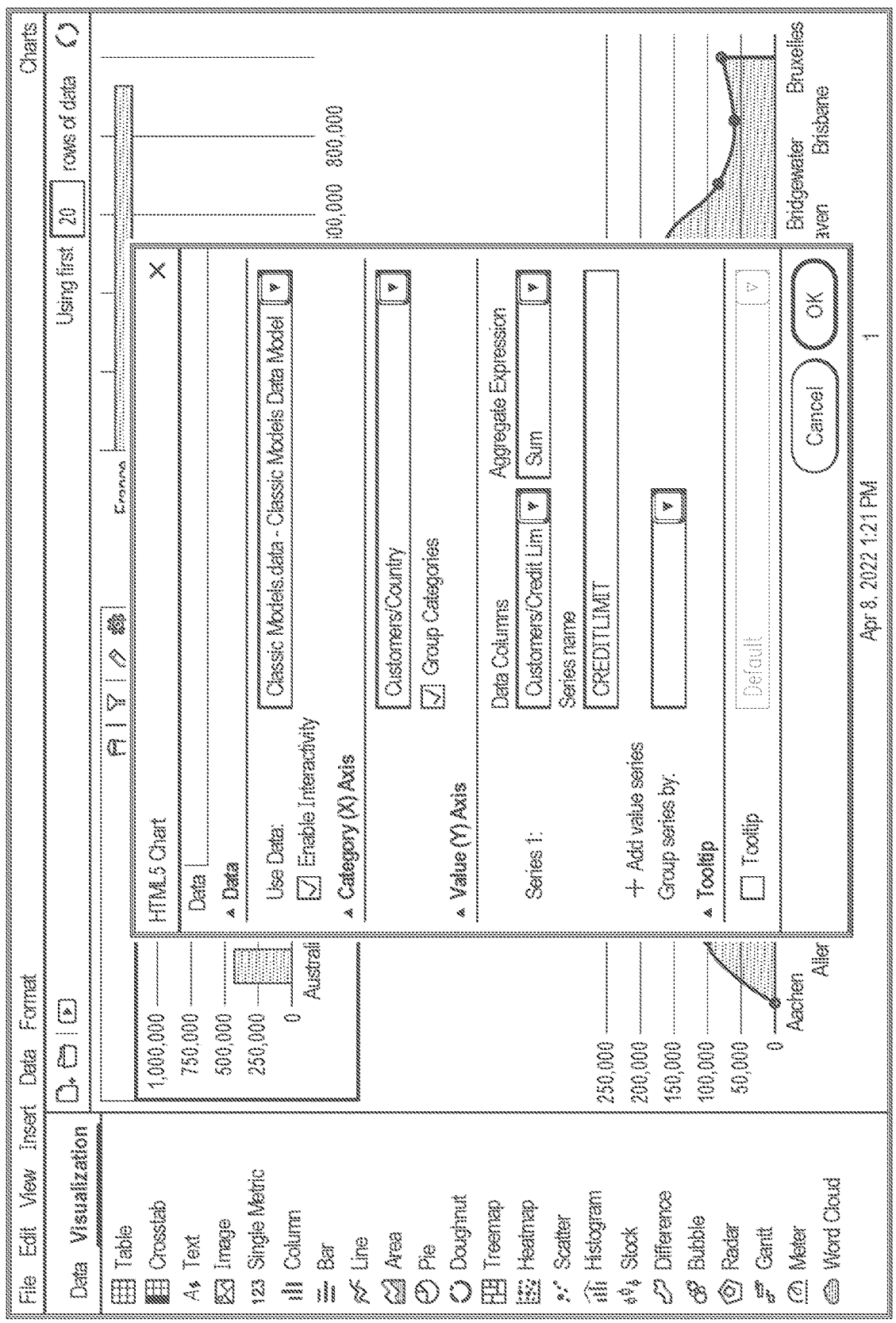

During the creation or editing of the visualization, the user must manually establish the data source(s) and data model(s) bound to the visualizations. This is shown in FIGS. 4A-4B. In FIG. 4A, the user selects a visualization component (e.g., bar graph), and in FIG. 4B, the user designates the data source and model bound to that visualization component. The visualization component will display data according to this binding.

Figure 5:
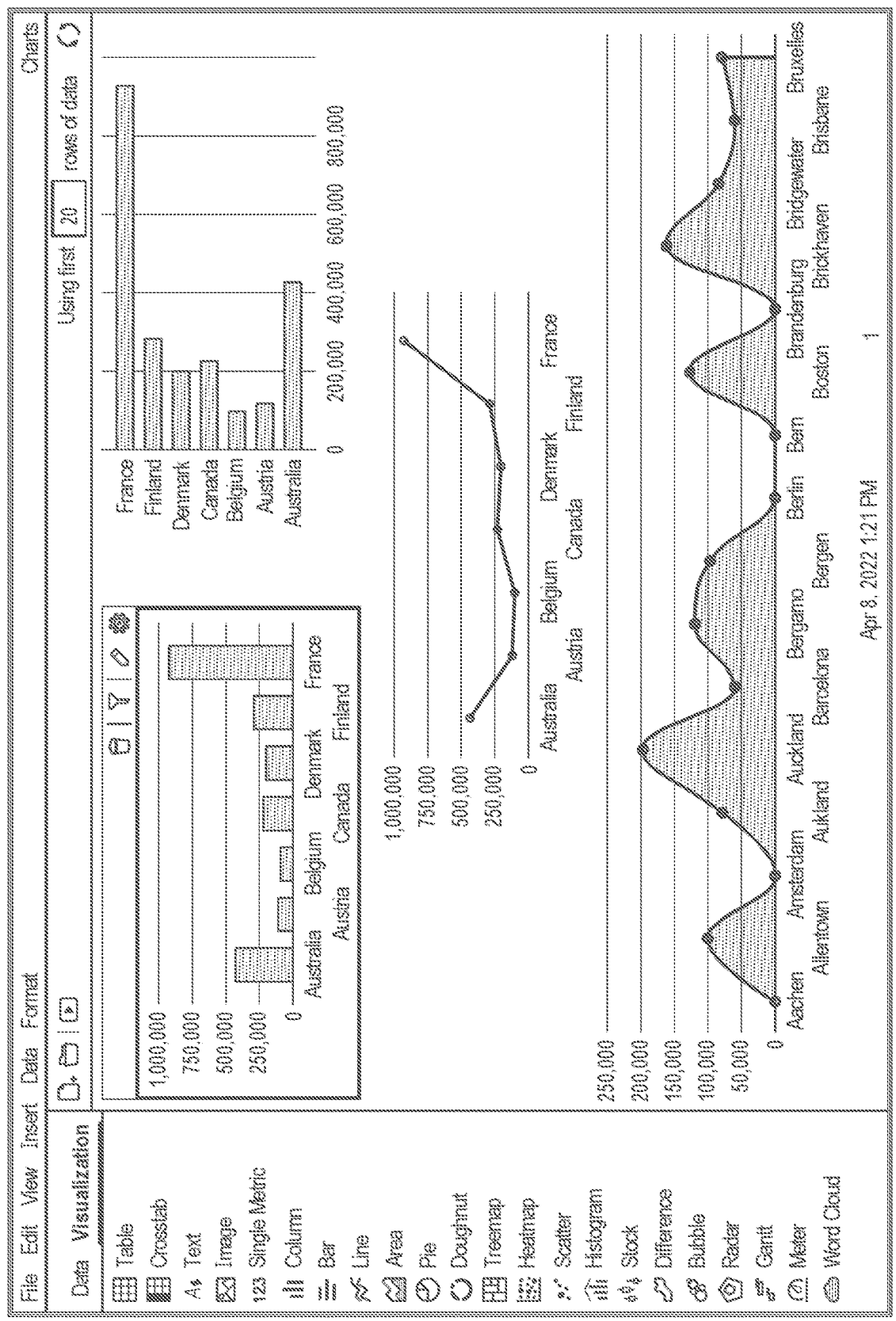

The user may move the visualization component to the desired location and/or add additional visualization components and arrange them according to a desired flow. For example, the user may desire for one visualization component to be displayed on the left, and another displayed on the right. FIG. 5 shows an example where a bar chart is selected and placed onto the dashboard.

Figure 6:
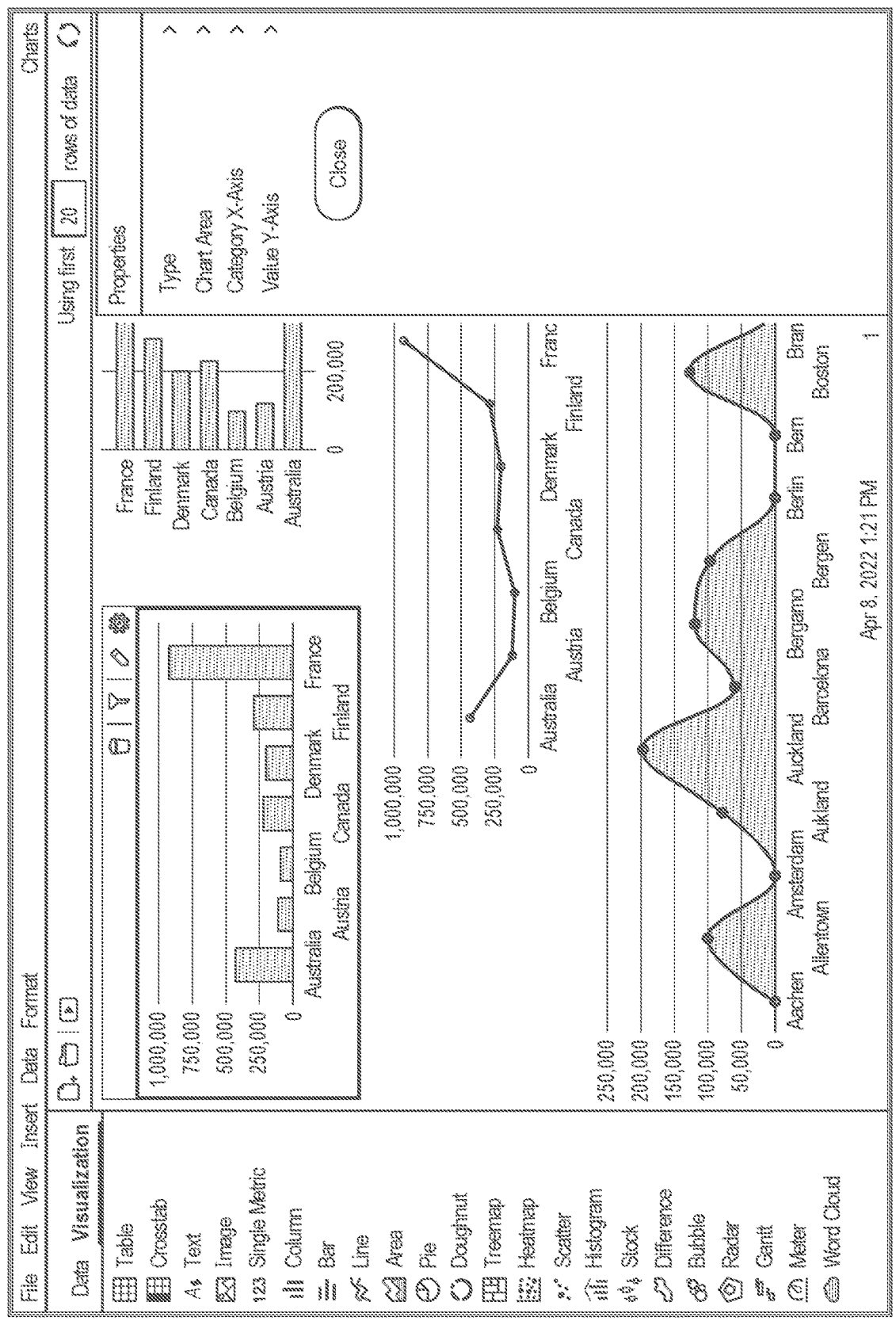

After placement of the visualization widget, the widget will typically require customizations. As illustrated in FIG. 6, such a customization can be done via setting property attributes from a menu.

Figure 7:
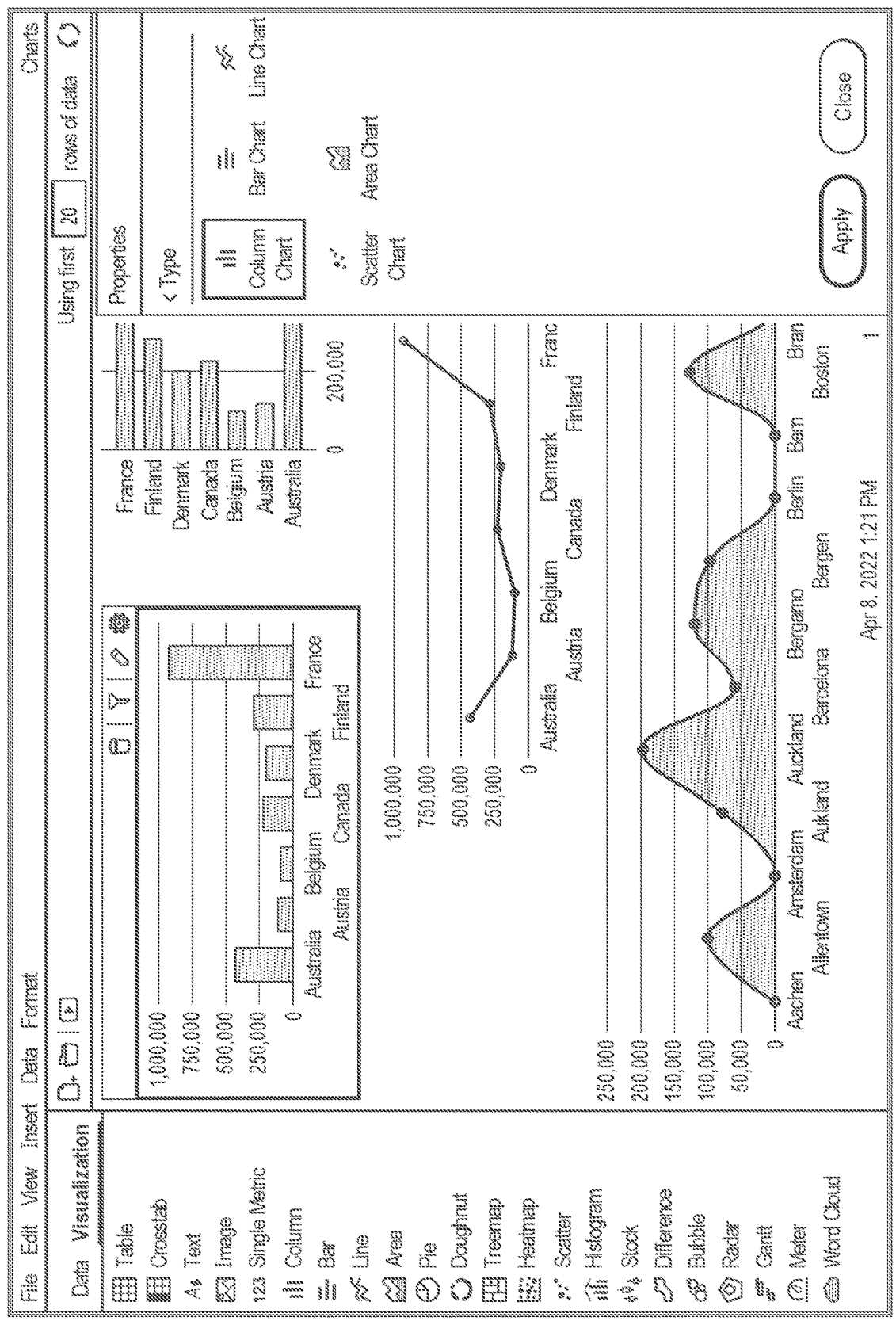

Additionally, the user may desire to change the chart type by selecting a different type from a menu. As illustrated in FIG. 7, the user is presented, through the menu, different visualization types (e.g., a column chart type, a bar chart type, a line chart type, a scatter chart type, or an area chart type) in case they want to change it.

Figure 8:
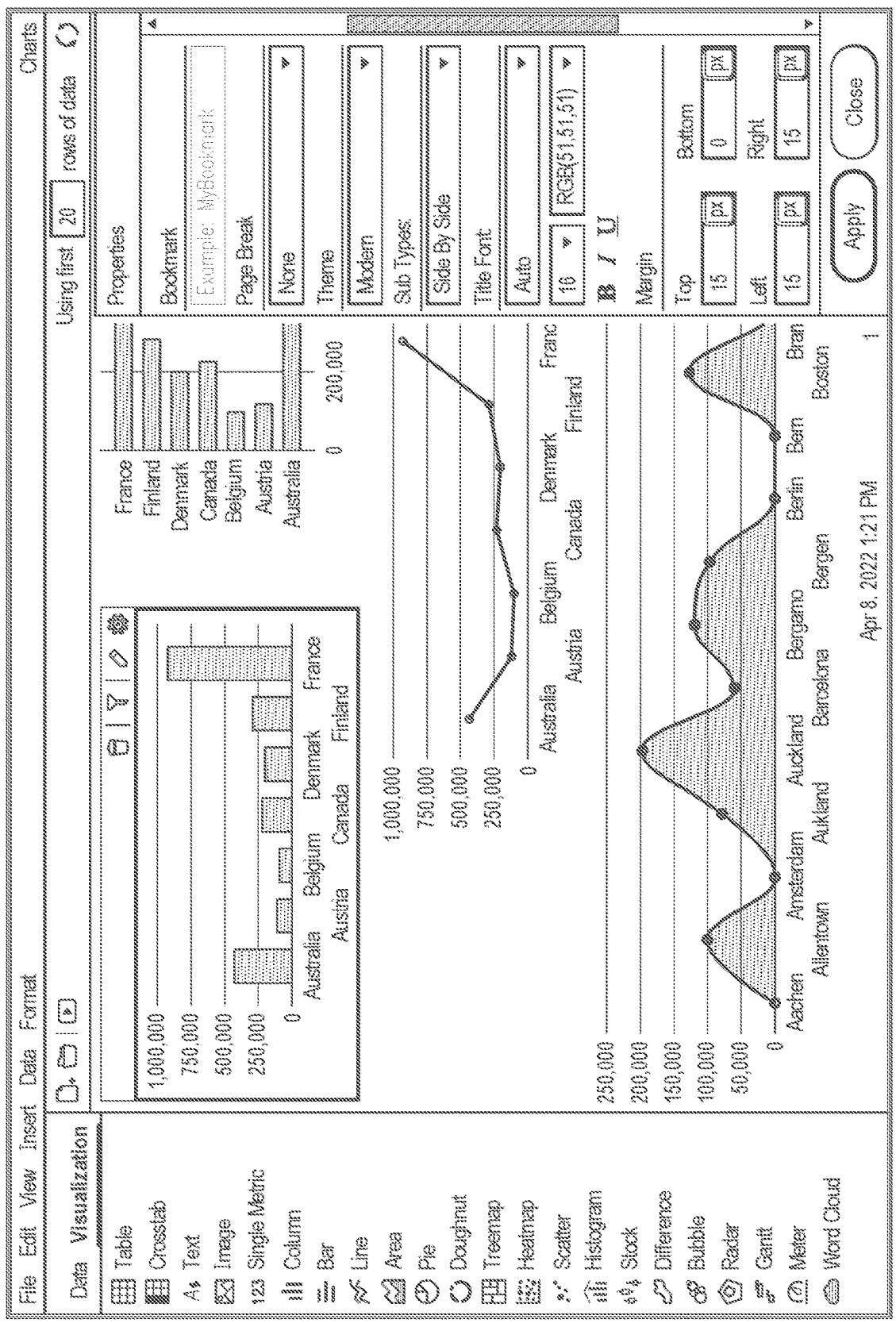

The user may continue to set various properties of the visualization widget, and properties of the dashboard itself to customize the look and feel and the desired behavior of the visualization. The user may also add additional visualization components. FIG. 8 shows an example of how the visualization component can be customized.

Finally, after the user has finished designing/building the visualization, the user would save the visualization and mark it for publication. At this point, an application would be able to access and display the visualization for BIR via a JavaScript-based BIR API.

As the above-described example illustrates, this visualization design process is tedious, time-consuming, and all very manual in nature where visualizations must be designed and published in advance. The invention disclosed here changes this paradigm by allowing a developer to declare, instead of code, what they want on a visualization and request the visualization be dynamically generated by making a REST API call to a BIR YAML descriptor interpreter which, in turn, collaborates with a BIR application to dynamically construct the requested content and return same automatically.

Generally, a new declarative approach entails creating a YAML object definition, also referred to herein as a YAML file or BIR YAML descriptor, to describe what they want in a declarative manner and making a REST API call to a BIR service from their application in development, passing the YAML object definition as payload, and the result is content dynamically constructed by the BIR service. The application developer can change or customize what is desired by only needing to change the YAML object definition. The use of YAML-based descriptors is new for the BI and reporting industry. This new method removes the need for a visualization designer tool and enables a developer to easily generate and enhance visualizations through a declarative method.

Figure 9:
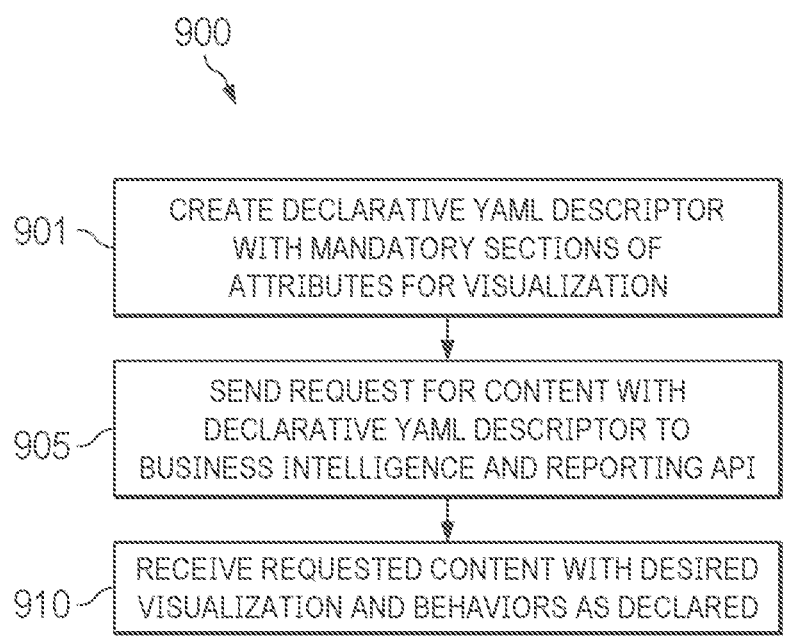
FIG. 9 is a flow chart that illustrates a declarative approach to designing business intelligence and reporting visualizations and behaviors via a YAML descriptor with mandatory sections of attributes according to some embodiments disclosed herein.

FIG. 9 is a flow chart that illustrates a new declarative method 900 for designing business intelligence and reporting visualizations and behaviors according to some embodiments disclosed herein. Method 900 begins with the creation of a declarative YAML descriptor with disparate mandatory sections of attributes (901). A non-limiting example of a YAML descriptor is provided below.

---

Basic Example of YAML descriptor:

kind: Dashboard
apiVersion: v1
metadata:
   name: UsersTradingActivityDashboard
spec:
metadata:
    comment: "This is my template for a user's trading activity dashboard"
  type: Content
  components:
  - name: FirstWidget
    componentRef: UsersTradingActivityBarChart
  - name: SecondWidget
    componentRef: UsersTradingActivityDetailTable

---

In the example above, the YAML descriptor has the following mandatory sections:

a. kind
b. apiVersion c. metadata
d. spec

In some embodiments, each mandatory section has a minimum set of attributes. The declarative YAML descriptor thus created is sent to a YAML descriptor interpreter via a BIR REST API (905).

The YAML descriptor interpreter collaborates with a BIR application on a backend system of an artificial intelligence platform to dynamically create the requested content (e.g., a web page with a desired visualization). An example of an artificial intelligence platform is described in U.S. Patent Application Publication No. US 2019/0279101 A1, which is incorporated by reference herein. In some embodiments, the YAML descriptor interpreter works with the BIR backend system, referred to as a BIR iHub server, within the artificial intelligence platform to dynamically construct requested content. The requested content, with the desired visualization and behaviors as declared in the YAML descriptor, is then automatically presented on the client device (910).

In some embodiments, the YAML descriptor interpreter is a server-based process that defines and enforces the API contract. It provides the REST API implementation which accepts a YAML based payload that is, in turn, interpreted to produce the visualization content returned to the caller (e.g., a client application on a client device). Upon invocation, the YAML descriptor interpreter is operable to examine the structure of the YAML payload and validate the existence of mandatory sections, which are sections necessary for the request to be understood and acted upon. Below is a non-limiting example of mandatory sections:

e. kind
f. apiVersion
g. metadata
h. datasources
i. layout

In some embodiments, other mandatory sections may be included. Although not listed here, non-mandatory sections and attributes can also be included in some embodiments. Further, although YAML is used to declare a descriptor for a visualization because of YAM L's ease of human readability, JSON could also be used.

In some embodiments, each of the mandatory sections must also have a minimum set of attributes present for the request to be serviced. If any of the mandatory sections or mandatory attributes within those sections is missing, an HTTP error 400 status code is returned to the caller. The mandatory sections are "kind" section: In this section, the type of content being requested must be specified. In some embodiments, the valid values are "Dashboard" or "Report".

"apiVersion" section: In this section, the version of the YAML object definition in use must be specified. In some embodiments, the valid values are "v1" but is subject to change.

"metadata" section: This section is used for naming the content in a human readable form, and for providing comments about the content. Both pieces of information are associated and logged with the generated visualization content for audit purposes.

"datasources" section: This section provides references to which data sources should be used to produce the resulting content. These data sources are named and referenceable via the names in the layout section. A minimum of one data source is required to be listed in this section, although there may be multiple data sources list and referenced by name in different declarations within the layout section.

"layout" section: This section is an important section as it describes the organization and flow of the generated content. Declarations within the layout sections are akin to a grid, where widgets are laid out by row and/or column and have attributes that describe the visualization component type and behavior. A layout is like a grid in the sense that it may designate rows or columns, although columns are implied. To declare multiple rows, the "row" tag must be supplied to start a visualization widget declaration. A non-limiting example is shown in Listing 1 below.

Listing 1.

```
- row:
    - type: Pie Chart
      datasets:
        - name: Classic Models Data Model
      binding:
        slice:
          column: Country
        value:
          column: Credit Limit
          aggregation: sum
    - type: Doughnut Chart
      datasets:
        - name: Classic Models Data Model
      binding:
        slice:
          column: Country
        value:
          column: Credit Limit
          aggregation: sum
    - type: Line Chart
      datasets:
        - name: Classic Models Data Model
      binding:
        x-axis:
          column: Country
        y-axis:
          column: Credit Limit
          aggregation: sum
```

In the example above, a row is declared to have three visualization widgets, a Pie Chart, a Doughnut Chart, and a Line Chart. Each widget has a declared set of attributes, such as datasets which designates the data set model should be used, and a binding attribute which provides details regarding how the data should be reflected on the widget. For example, in the above Line Chart declaration, the x-axis will reflect a country, and the y-axis will show a sum of credit limit per country.

Listing 2 below shows an example declaration of a visualization dashboard with two rows. On row one, there are three visualization charts, and on row two, there is one visualization chart. In this example, there is an optional section named "uioptions" that declared the event that will be emitted when the visualization is tapped or clicked on.

Figure 10:
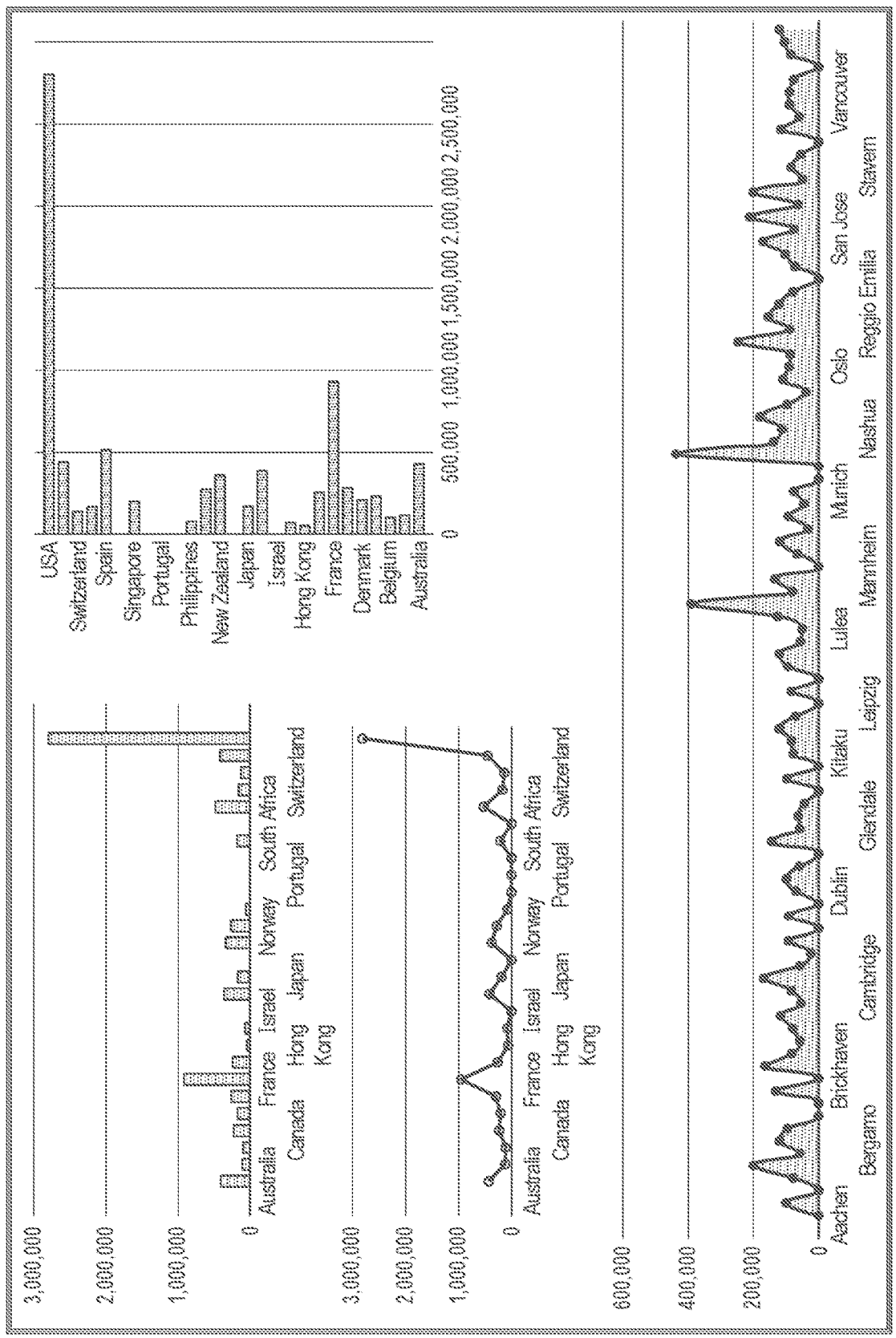
FIG. 10 depicts an example of a visualization automatically presented through a user interface on a client device in response to sending a request with a YAML descriptor that declaratively describes the visualization to a YAML descriptor interpreter via a REST API according to some embodiments disclosed herein.

In some embodiments, a data source/data model is provisioned in advance either using an existing API or via the web application portal. It is typical for data to be loaded into a data warehouse or lake in a reoccurring batch process. The result is shown in FIG. 10.

Listing 2.

```
kind: Dashboard
apiVersion: v1
metadata:
  name: /Home/sybil/ChartWithAxis.rptdesign
  comments: This is an example visualization using the YAML
based declarative method.
```

-continued

Listing 2.

```
datasources:
-        url: Classic Models
         version: v1
         accessType: latest
uioptions:
    events:
         -   name: onselected
             callback: onselected
layout:
-        row:
         -   type: Column Chart
             datasets:
                 -   name: Classic Models Data Model
                     binding:
                         x-axis:
                             column: Country
                         y-axis:
                             column: Credit Limit
                             aggregation: sum
         -   type: Bar Chart
             datasets:
                 -   name: Classic Models Data Model
                     binding:
                         x-axis:
                             column: Country
                         y-axis:
                             column: Credit Limit
                             aggregation: sum
         -   type: Line Chart
             datasets:
                 -   name: Classic Models Data Model
                     binding:
                         x-axis:
                             column: Country
                         y-axis:
                             column: Credit Limit
                             aggregation: sum
-        row:
         -   type: Area Chart
             datasets:
                 -   name: Classic Models Data Model
                     binding:
                         x-axis:
                             column: Country
                         y-axis:
                             column: Credit Limit
                             aggregation: sum
```

Figure 11A:
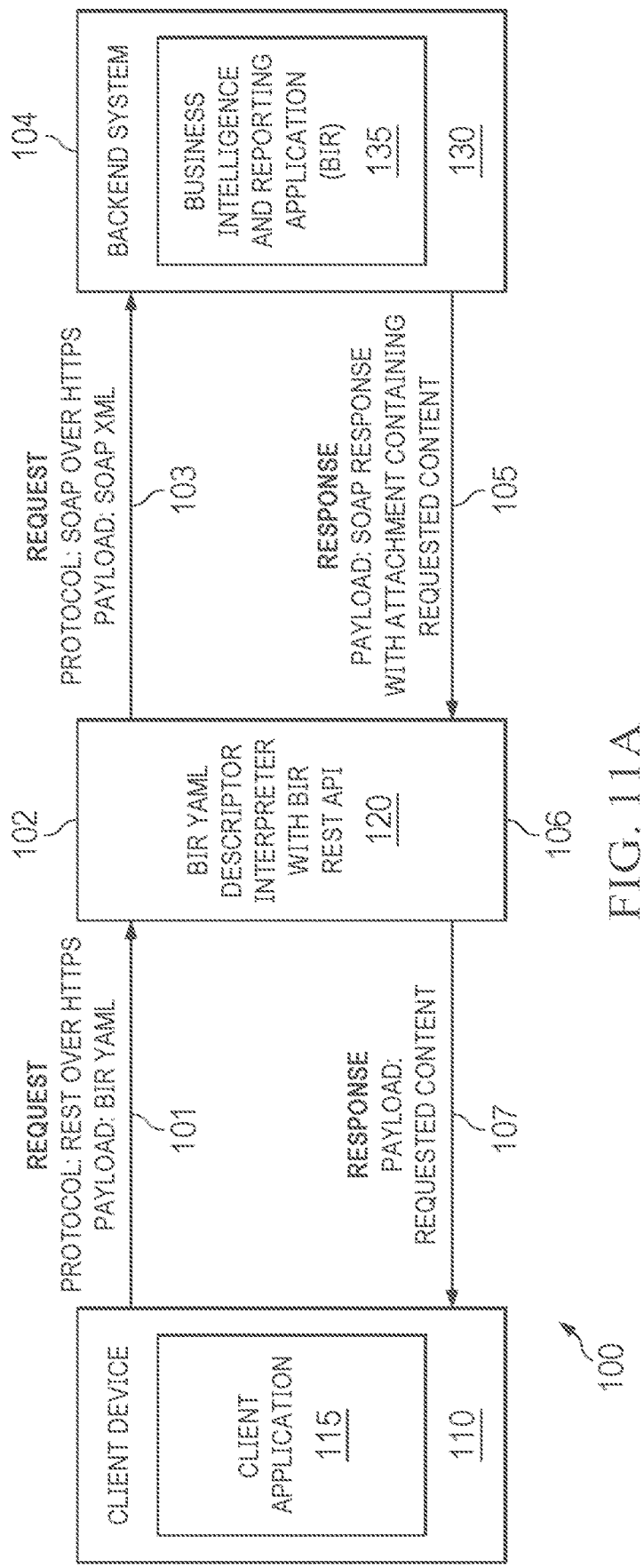
FIGS. 11A-11B show an example of collaboration between a YAML descriptor interpreter and a business intelligence and reporting application running on a backend system according to some embodiments disclosed herein.
Figure 11B:
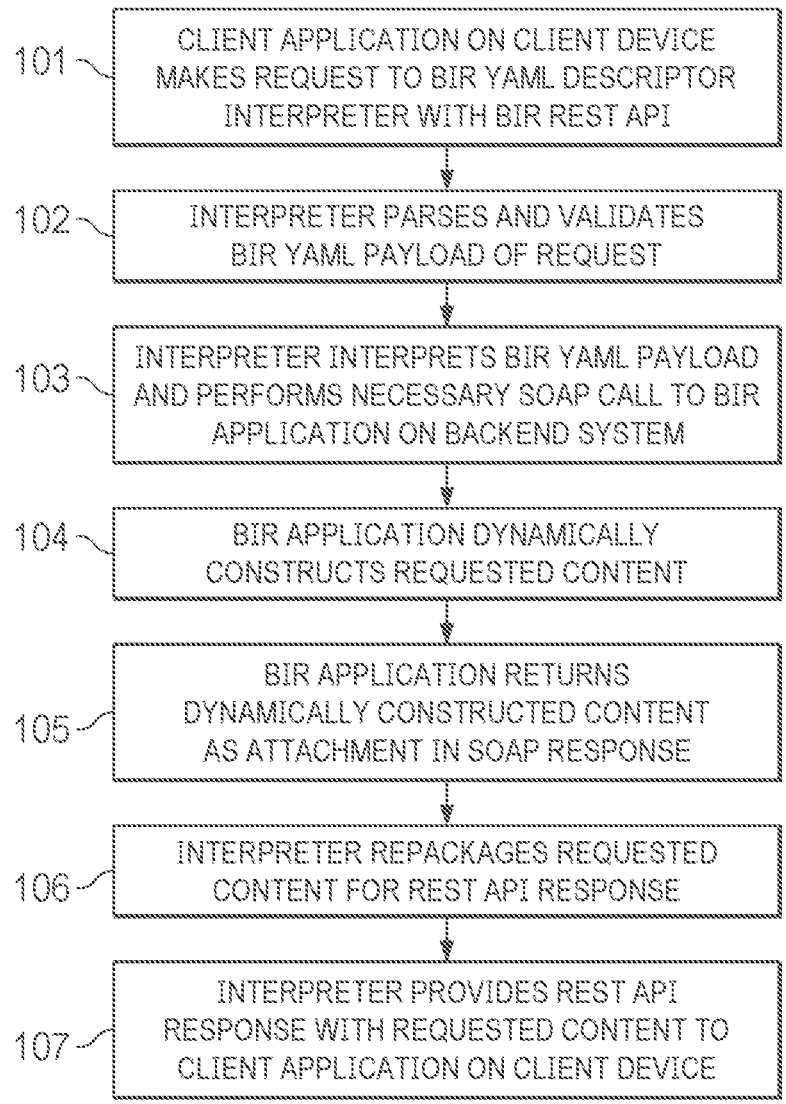

FIGS. 11A-11B show that the new capability enabled by the declarative approach discussed above is mostly a collaboration between the BIR YAML descriptor interpreter (also referred to herein as the interpreter) and the BIR application running on a backend system of an artificial intelligence platform. The artificial intelligence platform can include a BI reporting feature through which users can create their own dashboards, reports, visualizations, and so on from insights developed in other components of the artificial intelligence platform (e.g., a content analytics system, an advanced analytics system, etc.) and easily share or embed them where needed.

As illustrated in FIG. 11A, a system 100 implementing an embodiment disclosed herein may include a client device 110 having a client application 115 (e.g., a mobile phone application, a browser-based application, a customer application, etc.), a BIR YAML descriptor interpreter with a BIR REST API 120, and a backend system 130 having a BIR application 135. Referring to FIG. 11B, the client application on the client device may make a request (e.g., over Hypertext Transfer Protocol Secure (HTTPS)) to the BIR REST API which delegates the request to the BIR YAML descriptor interpreter (101). The request contains a BIR YAML payload with a declarative YAML descriptor. The BIR YAML descriptor interpreter is operable to parse the BIR YAML payload for the declarative YAML descriptor and validate the sections contained in the declarative YAML descriptor (102). The BIR YAML descriptor interpreter is further operable to interpret the content of the declarative YAML descriptor, prepare a SOAP request with a payload (e.g., in SOAP XML) based on the interpreted content of the declarative YAML descriptor, and make a SOAP call with the SOAP request over HTTPS to the BIR application on the backend system to construct the requested content (103). In response, the BIR application dynamically constructs the requested content (104) and returns the dynamically constructed content as an attachment in a SOAP response (105). The BIR YAML descriptor interpreter is operable to examine the SOAP response and repackage the requested content for a REST API response (106) and send the requested content back to the client application (107).

The primary job of the BIR YAML descriptor interpreter is to accept an external invocation (e.g., from a client application on a user device) against its API contract, then validate and translate the declarative YAML descriptor into necessary invocations against the BIR application (which, in some embodiments, is implemented as a BIR iHub server). In some embodiments, the following collaboration sequence occurs during this process:

1. The interpreter creates a blank design canvas payload onto which the translated YAML descriptor is populated into a JSON-like internal format proprietary to the BIR iHub server.
2. The integration from the interpreter to the BIR iHub server is via SOAP in a real-time call. The SOAP API is a internally used legacy SOAP API for the BIR iHub server.
3. The interpreter bootstraps the SOAP invocation with all necessary attributes to ensure a successful SOAP interaction. This includes, but is not limited to, the following:
   a. Creation of a HTTP session ID
   b. Service token to use to authenticate against the SOAP API
   c. Placement of essential visualization properties in the SOAP request attributes
   d. Placement of essential interactivity (event callback) properties in the SOAP request attributes, including but not limited to:
      i. onchange callback
      ii. onselected callback
      iii. onsessiontimeout callback
      iv. onexception callback
      v. ondialogok callback
      vi. oncontentdragselection callback
      vii. oncontentdropselection callback
      viii. onfilterbroadcast callback
   e. Mapping the request user/service account to the appropriate report volume within the BIR iHub server
   f. Mapping the request session attributes to necessary SOAP request session attributes
4. For table (tabular) visualizations, placement of the table column properties in the SOAP request attributes.
5. Interpreter receives the response payload back from the SOAP API invocation and repackage the payload in the response to the REST API invocation. The response created by the Interpreter can include additional HTTP attributes, including but not limited to:
   a. Character encoding (e.g., UTF-8)
   b. Content type (e.g., text/html)

c. Cache control (e.g., no-cache)
d. Expiry control (e.g., date header and expires attributes)

| DART Code (Mobile Application Example Code): |
|---|
| MaterialApp (<br>  title: "Application Title",<br>  home: Scaffold (<br>    body: Container (<br>      child: WebView (<br>        initialUrl: baseReportURL +<br>reportContextPath + folderPath + chartName +<br>"?userid=" + userId, |

| DART Code (Mobile Application Example Code): |
|---|
|         onWebViewCreated: (controller) {<br>          _myController = controller; }<br>      )<br>    )<br>  )<br>) |

Example HTTP REST API Invocation (POST) with Response to Create the Visualization Based on Declaration in YAML Format:

```
POST /iportal/yaml?userid=administrator HTTP/1.1
Content-Type: text/plain
User-Agent: PostmanRuntime/7.29.0
Accept: */*
Postman-Token: c4d3fa37-5895-4312-861a-e926f7f2ebeb
Host:
Accept-Encoding: gzip, deflate, br
Connection: keep-alive
Content-Length: 617
metadata:
    name: /Home/administrator/RHLBE.rptdesign
datasources:
    -           url: Classic Models
                version: -1
                accessType: latest
layout:
    -   row:
        -           type: Area Chart
                    bookmark: MyAreaChart
                    datasets:
                    -           name: Classic Models Data Model
                    binding:
                        x-axis:
                                    column: City
                        y-axis:
                                    column: Credit Limit
                                    aggregation; sum
    -   row:
        -           type: Area Chart
                    datasets:
                    -           name: Classic Models Data Model
                    binding:
                        x-axis:
                                    column: Territory
                        y-axis:
                            column: Credit Limit
                            aggregation: sum
(Response)
HTTP/1.1 200 OK
Referrer-Policy: same-origin
X-Frame-Options: SAMEORIGIN
Strict-Transport-Security: max-age=31536000
Cache-Control: no-cache
X-Content-Type-Options: nosniff
Content-Security-Policy:
hstsMaxAgeSeconds: 31536000
hstsIncludeSubDomains: true
X-XSS-Protection: 1; mode=block
hstsEnabled: true
Set-Cookie: JSESSIONID=C915F0D4906D6459FD7FCC92B148D999; Path=/;
HttpOnly; SameSite=Strict
Pragma: no-cache
Expires: Thu, 01 Jan 1970 00:00:00 GMT
vary: accept-encoding
Content-Encoding: gzip
Content-Type: text/plain;charset=utf-8
Content-Language: en-US
Transfer-Encoding: chunked
Date: Fri, 27 May 2022 18:08:25 GMT
Keep-Alive: timeout=20
```

-continued

```
Connection: keep-alive
Server: web
{"uioptions":{"shownavigation":false},"filename":"/Home/administr
ator/RHLBE.rptdesign","response":{"message":"Message processed"}}
```

Appendix A, which forms part of this disclosure, provides an example of a SOAP Request and a corresponding Response.

The new declarative approach described above streamlines the incorporation of BI and reporting into an application (e.g., a mobile application, a browser-based application, etc.). Suppose an application developer wants BI graphs and a BI dashboard in the application. Traditionally, the application developer would be forced to code the BI graphs and the BI dashboard into the application. As those skilled in the art can appreciate, JavaScript codification is tedious and error-prone and requires a massive effort. For instance, to show a dashboard, one has to code in JavaScript for browsers, download a specific library compatible with the web framework used, integrate to make JavaScript calls to get something to show within the application, writing hundreds/thousands of lines of code.

The new declarative approach eliminates the need to code such visualizations into the application and the need for a designer tool. With the declarative approach, the application developer describes the BIR component they want in a declarative manner via a declarative descriptor (e.g., in YAML, JSON, etc.). The declarative descriptor is sent to an interpreter (e.g., a BIR YAML descriptor interpreter) which interprets and provides the BIR component back in real-time.

In some embodiments, the application developer is provided with a YAML object (for a payload of annotations and sets of objects and attributes). The application developer indicates, without need to code, where and what to display and a corresponding configuration and invokes a published REST API. That is, instead of coding, a YAML-based request payload for the REST API call is used to describe the desired content. In response, the requested content, including all the components, is dynamically generated and returned in real time. The application developer can then place, embed, or otherwise integrate the BIR content (e.g., a web page with a BIR visualization) thus returned in the application.

The declarative approach disclosed herein provides a new delivery method for declarative BI and reporting content. The new method streamlines an application developer's consumption of BI and reporting content without needing to develop metrics, dashboards, and reports in advance, eliminates the need for a human to pre-construct the content via a browser-based designer tool, and reduces the number of steps and effort needed to blend in BI and reporting in the application. This declarative approach also reduces from a multi-step multi-day effort to an on-the-fly result. This API-based consumption and content syndication can be achieved in five minutes or less.

Figure 12:
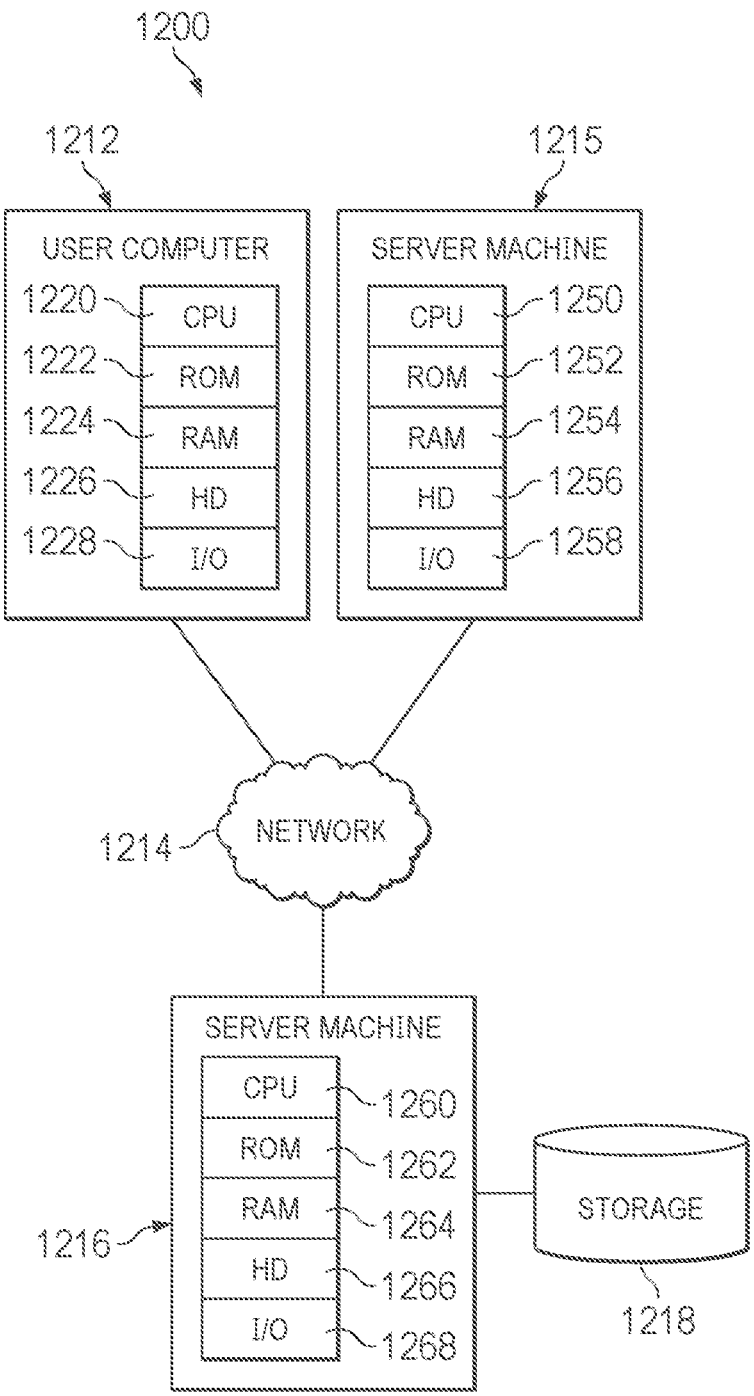
FIG. 12 depicts a diagrammatic representation of an example of networked data processing systems for implementing some embodiment disclosed herein.

FIG. 12 depicts a diagrammatic representation of an example of networked data processing systems for implementing some embodiment disclosed herein. In the example illustrated, network computing environment 1200 includes network 1214 that can be bi-directionally coupled to user computer 1212, server machine 1215, and server machine 1216. Server machine can be bi-directionally coupled to persistent storage 1218. Network 1214 may represent a combination of wired and wireless networks that network computing environment 1200 may utilize for various types of network communications known to those skilled in the art.

For the purpose of illustration, a single system is shown for each of user computer 1212, server machine 1215, and server machine 1216. However, with each of user computer 1212, server machine 1215, and server machine 1216, a plurality of computers (not shown) may be interconnected to each other over network 1214. For example, a plurality of user computers 1212 and a plurality of server machines 1215 may be coupled to network 1214. User computer 1212 may include data processing systems for communicating with server machine 1216. As a non-limiting example, a client application may run on user computer 1212 and be communicatively connected through a YAML descriptor service to a BIR application on a backend system running on server machine 1216. Server machine 1216 may be part of an artificial intelligence platform as described above.

User computer 1212 can include central processing unit ("CPU") 1220, read-only memory ("ROM") 1222, random access memory ("RAM") 1224, hard drive ("HD") or storage memory 1226, and input/output device(s) ("I/O") 1228. I/O 1228 can include a keyboard, monitor, printer, electronic pointing device (e.g., mouse, trackball, stylus, touch interface, etc.), or the like. User computer 1212 can include a desktop computer, a laptop computer, a personal digital assistant, a cellular or smart phone, or nearly any device capable of communicating over a network. Server machine 1216 may be similar to user computer 1212 and can comprise CPU 1260, ROM 1262, RAM 1264, HD 1266, and I/O 1268. Likewise, server machine 1215 may include CPU 1250, ROM 1252, RAM 1254, HD 1256, and I/O 1258. Many other alternative configurations are possible and known to skilled artisans.

Each of the computers in FIG. 12 may have more than one CPU, ROM, RAM, HD, I/O, or other hardware components. For the sake of brevity, each computer is illustrated as having one of each of the hardware components, even if more than one is used. Each of computers 1212, 1215, and 1216 is an example of a data processing system. ROM 1222, 1252, and 1262; RAM 1224, 1254, and 1264; HD 1226, 1256, and 1266; and database 1218 can include media that can be read by CPU 1220, 1250, or 1260. Therefore, these types of memories include non-transitory computer-readable storage media. These memories may be internal or external to computers 1212, 1215, or 1216.

Portions of the methods described herein may be implemented in suitable software code that may reside within ROM 1222, 1252, or 1262; RAM 1224, 1254, or 1264; or HD 1226, 1256, or 1266. In addition to those types of memories, the instructions in an embodiment disclosed herein may be contained on a data storage device with a different computer-readable storage medium, such as a hard disk. Alternatively, the instructions may be stored as software code elements on a data storage array, magnetic tape, floppy diskette, optical storage device, or other appropriate data processing system readable medium or storage device.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a local area network (LAN), wide area network (WAN), and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer-readable medium, hardware circuitry or the like, or any combination and that may be translatable by one or more server machines. Examples of a non-transitory computer-readable medium are provided below in this disclosure.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively or additionally, the computer-executable instructions may be stored as software code components on a direct access storage device array, magnetic tape, floppy diskette, optical storage device, or other appropriate computer-readable medium or storage device.

Any suitable programming language can be used to implement the routines, methods, or programs of embodiments of the invention described herein, including C, C++, Java, JavaScript, HyperText Markup Language (HTML), Python, or any other programming or scripting code. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps, and operations described herein can be performed in hardware, software, firmware, or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. The functions of the invention can be achieved in many ways. For example, distributed or networked systems, components, and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory. Such computer-readable medium shall be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted. The scope of the disclosure should be determined by the following claims and their legal equivalents.

What is claimed is:

1. A method, comprising:
receiving, by a declarative descriptor interpreter from a client application on a client device over a REST application programming interface (API), a request for business intelligence (BI) and reporting (BIR) content, wherein the request includes a declarative descriptor for the BIR content;
interpreting, by the declarative descriptor interpreter, the declarative descriptor for the BIR content in preparation for a Simple Object Access Protocol (SOAP) API call;
making, by the declarative descriptor interpreter, the SOAP API call to a BIR server operating on an artificial intelligence platform, wherein the BIR server dynamically constructs the BIR content in response to the SOAP API call and returns a SOAP response with the dynamically constructed BIR content;
repackaging, by the declarative descriptor interpreter, the BIR content dynamically constructed by the BIR server for a REST API response; and
communicating, by the declarative descriptor interpreter in response to the request from the client application, the BIR content dynamically constructed by the BIR server and repackaged by the declarative descriptor interpreter to the client application on the client device.

2. The method according to claim 1, wherein the declarative descriptor for the BIR content is in Yet Another Markup Language (YAML) or JavaScript Object Notation (JSON).

3. The method according to claim 1, wherein the declarative descriptor for the BIR content has a plurality of mandatory sections of attributes.

4. The method according to claim 3, wherein each of the plurality of mandatory sections of attributes has a minimum set of attributes.

5. The method according to claim 3, wherein the plurality of mandatory sections of attributes comprises a kind section, an API version section, a metadata section, a data source section, and a layout section.

6. The method according to claim 1, wherein the interpreting comprises examining a structure of a payload of the request and validating existence of mandatory sections in the declarative descriptor for the BIR content.

7. The method according to claim 1, wherein the declarative descriptor interpreter is implemented as a BIR service provided by the BIR server operating on the artificial intelligence platform.

8. A system, comprising:
a processor;
a non-transitory computer-readable storage medium; and
instructions stored on the non-transitory computer-readable storage medium and translatable by the processor for performing a method comprising:
receiving, by a declarative descriptor interpreter from a client application on a client device over a REST application programming interface (API), a request for business intelligence (BI) and reporting (BIR) content, wherein the request includes a declarative descriptor for the BIR content;
interpreting, by the declarative descriptor interpreter, the declarative descriptor for the BIR content in preparation for a Simple Object Access Protocol (SOAP) API call;
making, by the declarative descriptor interpreter, the SOAP API call to a BIR server operating on an artificial intelligence platform, wherein the BIR server dynamically constructs the BIR content in response to the SOAP API call and returns a SOAP response with the dynamically constructed BIR content;

repackaging, by the declarative descriptor interpreter, the BIR content dynamically constructed by the BIR server for a REST API response; and communicating, by the declarative descriptor interpreter in response to the request from the client application, the BIR content dynamically constructed by the BIR server and repackaged by the declarative descriptor interpreter to the client application on the client device.

9. The system according to claim 8, wherein the declarative descriptor for the BIR content is in Yet Another Markup Language (YAML) or JavaScript Object Notation (JSON).

10. The system according to claim 8, wherein the declarative descriptor for the BIR content has a plurality of mandatory sections of attributes.

11. The system according to claim 10, wherein each of the plurality of mandatory sections of attributes has a minimum set of attributes.

12. The system according to claim 10, wherein the plurality of mandatory sections of attributes comprises a kind section, an API version section, a metadata section, a data source section, and a layout section.

13. The system according to claim 8, wherein the interpreting comprises examining a structure of a payload of the request and validating existence of mandatory sections in the declarative descriptor for the BIR content.

14. The system according to claim 8, wherein the declarative descriptor interpreter is implemented as a BIR service provided by the BIR server operating on the artificial intelligence platform.

15. A computer program product comprising a non-transitory computer-readable storage medium storing instructions translatable by a processor for performing a method comprising:

receiving, by a declarative descriptor interpreter from a client application on a client device over a REST application programming interface (API), a request for business intelligence (BI) and reporting (BIR) content, wherein the request includes a declarative descriptor for the BIR content;

interpreting, by the declarative descriptor interpreter, the declarative descriptor for the BIR content in preparation for a Simple Object Access Protocol (SOAP) API call;

making, by the declarative descriptor interpreter, the SOAP API call to a BIR server operating on an artificial intelligence platform, wherein the BIR server dynamically constructs the BIR content in response to the SOAP API call and returns a SOAP response with the dynamically constructed BIR content;

repackaging, by the declarative descriptor interpreter, the BIR content dynamically constructed by the BIR server for a REST API response; and communicating, by the declarative descriptor interpreter in response to the request from the client application, the BIR content dynamically constructed by the BIR server and repackaged by the declarative descriptor interpreter to the client application on the client device.

16. The computer program product according to claim 15, wherein the declarative descriptor for the BIR content is in Yet Another Markup Language (YAML) or JavaScript Object Notation (JSON).

17. The computer program product according to claim 15, wherein the declarative descriptor for the BIR content has a plurality of mandatory sections of attributes.

18. The computer program product according to claim 17, wherein each of the plurality of mandatory sections of attributes has a minimum set of attributes.

19. The computer program product according to claim 17, wherein the plurality of mandatory sections of attributes comprises a kind section, an API version section, a metadata section, a data source section, and a layout section.

20. The computer program product according to claim 15, wherein the interpreting comprises examining a structure of a payload of the request and validating existence of mandatory sections in the declarative descriptor for the BIR content.

* * * * *